I. D. THORNBURGH.
APPARATUS FOR LINING CAN ENDS.
APPLICATION FILED NOV. 6, 1917.
1,408,783.
Patented Mar. 7, 1922.
2 SHEETS—SHEET 1.
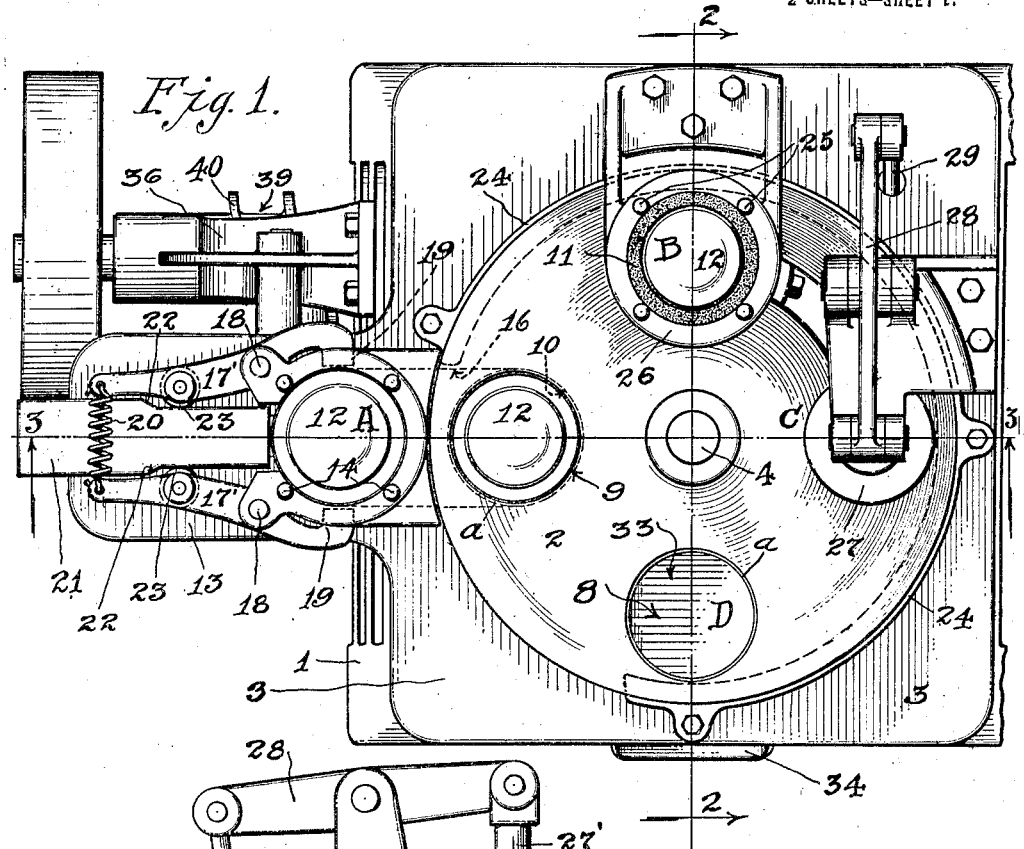
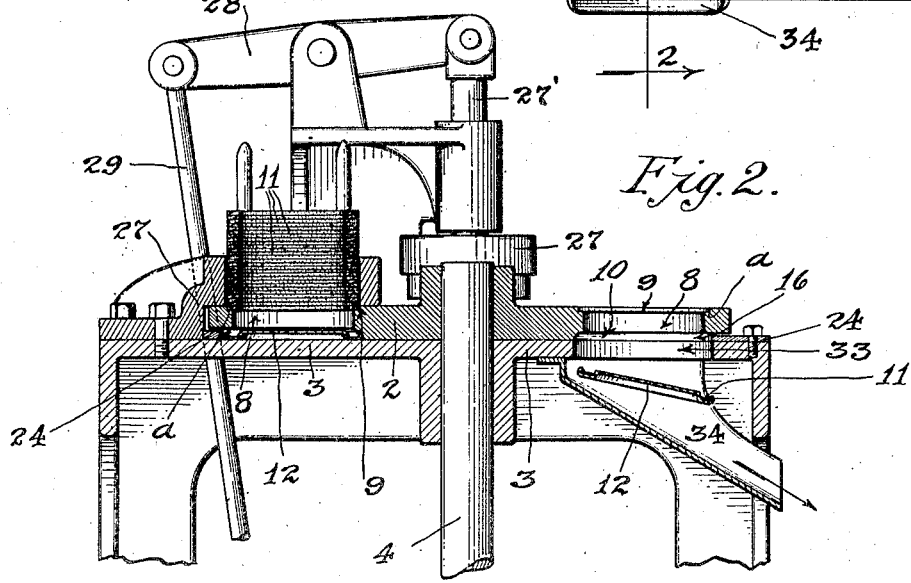

I. D. THORNBURGH.
APPARATUS FOR LINING CAN ENDS.
APPLICATION FILED NOV. 6, 1917.
1,408,783.
Patented Mar. 7, 1922.
2 SHEETS—SHEET 2.
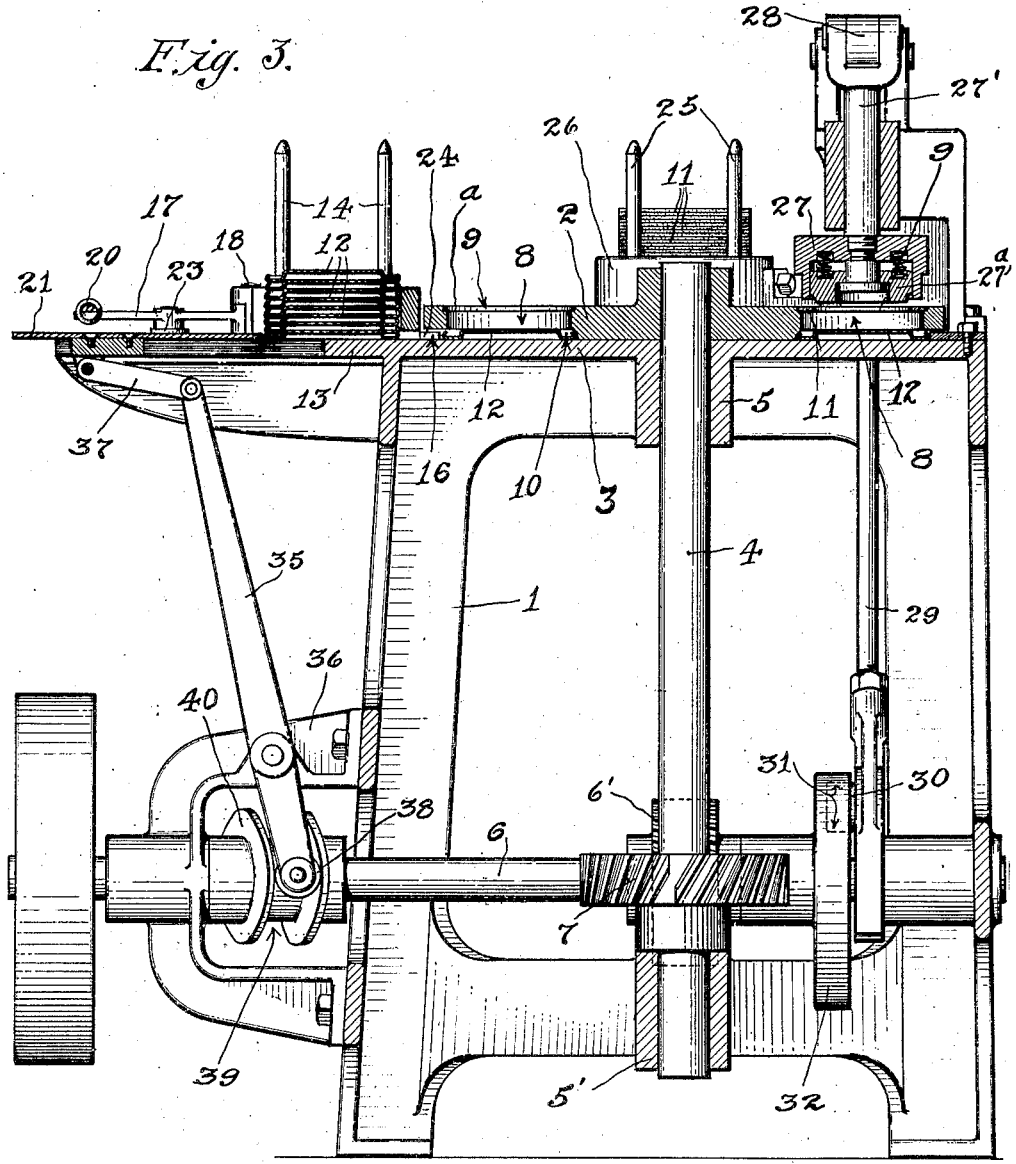
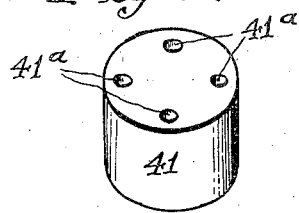

UNITED STATES PATENT OFFICE.

IVAN D. THORNBURGH, OF BERKELEY, CALIFORNIA, ASSIGNOR TO AMERICAN CAN COMPANY, OF SAN FRANCISCO, CALIFORNIA, A CORPORATION OF NEW JERSEY.

APPARATUS FOR LINING CAN ENDS.

1,408,783.   Specification of Letters Patent.   Patented Mar. 7, 1922.

Application filed November 6, 1917. Serial No. 200,517.

*To all whom it may concern:*

Be it known that I, IVAN D. THORNBURGH, a citizen of the United States, residing at Berkeley, in the county of Alameda and State of California, have invented certain new and useful Improvements in Apparatus for Lining Can Ends, of which the following is a specification.

The hereinafter described invention relates to an apparatus for automatically removing previously cut gasket liners successively from a stack of such liners held within a suitable container and transferring the ring liner so removed and a flanged can end in axial alignment therewith to an assembling station and applying at said station the gasket liner to the flange of the can end for use in the subsequent operation for the production of an interfolded hermetic seam with flanged can bodies.

The object of the invention, is to permit previously cut gasket liners to be arranged in stack formation, whereby the cutting of the gasket liners may be performed at a distant point from the assembling means for applying the gasket liner to the flange of a can end, thus, permitting previously cut liners to be transported to a distant point, as for instance, a canning plant, and there assembled relative to flanged can ends to be applied to can bodies, and by so doing avoiding the shipment of gasket lined flanged ends to the canning establishment.

In order to comprehend the invention, reference should be had to the accompanying sheets of drawings, wherein, Fig. 1 is a plan view of an apparatus designed for the carrying out of the invention, said view illustrating the mechanism for delivering flanged can ends to an apertured rotatable turret, the position of the gasket liner holder relative to said turret, and means associated therewith for assembling the gasket liner relative to the flange, of an axially aligned can end.

Fig. 2 is a cross-sectional elevation taken on the line 2—2 of Fig. 1 of the drawings and viewed in the direction of the arrows.

Fig. 3 is a sectional elevation taken on the line 3—3 of Fig. 1 of the drawings, and viewed in the direction of the arrows.

Fig. 4 is a detailed view of a pressure weight adapted to be used in connection with the holder for the stack of cut gasket ring liners.

In the drawings, the numeral 1, is used to designate any suitable form of sustaining frame for supporting the working parts of the apparatus, and 2, a horizontally disposed rotatable turret working over the table 3, of the supporting structure. The turret 2, is secured to a rotatable vertical shaft 4 working in bearings 5 and 5' of the frame structure, and rotation is imparted to the said shaft 4 from the power shaft 6, by means of a worm 6', mounted on said shaft intermeshing with the worm gear 7 mounted on the vertical shaft 4, and which latter is preferably a mutilated worm in order to impart intermittent rotation to the shaft 4.

The rotatable turret 2, is provided with a series, circumferentially disposed, of spaced vertical apertures 8, each aperture being formed with an upper enlarged recessed portion 9, and an enlarged lower recessed portion 10, the upper enlarged recessed portions of each aperture 8, being designed to receive a gasket ring liner 11, and the lower enlarged recessed portion a flanged can end 12, the ring liner 11 being sustained and held in position by means of the shoulder *a* of the aperture 8.

From one side of the supporting structure 1, is projected a bracket 13, which supports a can end holder 14, adapted to contain a stack of horizontally disposed can ends or heads 12. The lowermost can end or head of the stack within the holder 14, rests on and is supported by the bracket 13, and at times during the movement of the turret 2 is in horizontal alignment with one of the transverse can ends or head openings 16, formed in the under-face of the rotatable turret 2, and which communicate with and constitute a continuation of the enlarged recessed portions 10 thereof, the openings 16 forming a radial cut-out for each of the can end seats 10 of the rotatable turret.

To the bracket 13, on the upper face thereof, the cut-out arms 17 and 17' are pivoted or fulcrumed by the pins 18 to swing horizontally, Fig. 1 of the drawings, and the inner end of each arm terminates in an inwardly projected beveled blade section 19; the said arms are connected at their outer end portions by the spring 20, so that the arms are normally held separated at their inner ends.

The lowermost can end of the stack of ends contained within the holder 14, is cut out or removed by means of a reciprocating slide 21, which slide is provided with the outwardly inclined portions 22, which during the inward movement of the slide 21, acts against the rolls 23, of the arms 17 and 17' to separate or spread the same apart at their outer ends and force the same inwardly at their inner ends so as to place the blade sections 19 thereof between the lowermost can end and the can end immediately thereabove, and by so doing raising the stack to free the lowermost end of the weight thereof. The construction and operation of the can end feed mechanism is substantially the same in operation as that set forth and described in United States Letters Patent No. 1,162,156, granted James A. Gray under date of Nov. 30, 1915, for improved can end feed mechanism, hence the same need not be described in detail herein, it being understood that the slide 21, as moved inwardly cuts out the lowermost end of the stack of can ends within the holder 14, and moves the same beneath the rotatable turret 2 and into the enlarged recess seat 10 thereof, through the radial cut-out portion 16. After an unlined flanged can end has been received into one of the seats 10 of the rotatable turret 2, the said turret is advanced by a stepped rotation to what shall be termed the gasket liner station B of the apparatus, the can end feed station being designated by the letter A. As the turret with the unlined flanged can end positioned within the can end seat thereof is advanced toward the gasket liner station, the positioned can end is held within its seat by means of the segmental wall 24, which is secured to the table 3, of the supporting structure of the apparatus and over the surface of which table moves the confined can end 12.

At the station B is situated a holder 25, adapted to contain a stack of horizontally disposed previously cut gasket liners 11, the lowermost liner of the stack normally resting on the top surface of the horizontally movable apertured member 2. As an apertured section 8 of the rotatable turret is advanced beneath the holder 25, which overlies the turret 2 and is held in place by means of the bracket 26 attached to the frame plate 3, the lowermost liner 11 of the stack of gasket liners will move by the weight of the stack or by pressure applied thereto, into the enlarged recessed seat 9 of the aperture 8 of the rotatable turret and will rest on the shoulder a thereof. Inasmuch as the depth of the recess or enlarged seat 9 is that of the thickness of a single gasket ring liner 26, it is obvious that when a ring liner is moved into said seat the same is completely filled, it being understood that an apertured section of the rotatable turret is moved beneath the gasket liner holder 25, when the same is brought to a state of rest. After the lowermost gasket liner of the stack of cut liners is seated within the recessed portion 9 of the aperture 8, rotation is imparted to the rotatable turret 2, carrying the apertured section with the gasket liner seated therein from within the sphere of the holder 25, thus cutting out the lowermost liner of the stack of gasket liners and leaving the remainder of the stack supported on the upper surface of the rotatable turret intermediate the opertured sections thereof, and the rotatable turret with the unlined flanged can end in axial alignment with the seated gasket liner 11 is advanced to the assembling station C and at said station is brought to a state of rest with the gasket liner immediately beneath and in axial alignment with the plunger head 27 of the reciprocating plunger 27' which plunger at its upper end is pivotally connected to the fulcrumed lever 28, connected at its opposite end to the operating rod 29 which has vertical movement imparted thereby by means of the roller 30, carried by and projecting from the lower end thereof working within a cam groove 31, cut in the face of the disk 32, mounted on the drive shaft 6.

Within the plunger head 27 is mounted a spring held gauge ring 27ª, which, on the downward stroke of the plunger 27, bears onto the paneled portion of the can end 12, and holds the same securely in place and forms a gauge ring or gauge wall in conjunction with the inner wall of the aperture 8, for guiding the gasket liner 11, as moved from within its seat by the plunger head 27 and forced downwardly onto the flange of the can end 12. After the gasket liner has been applied to the flange of the can end, the plunger head is lifted or raised from within the aperture 8 to clear the rotatable turret 2, after which the turret 2 is advanced to place the aperture thereof containing the gasket lined can end in axial alignment with the discharge aperture 33, formed in the table 3 of the supporting structure at the discharge station D, through which apertured portion 33, the lined can end falls by gravity onto the downwardly inclined chute 34 which delivers the same to a suitable place of deposit.

It will be understood that reciprocating motion is imparted to the cut out slide plate 21 of the can end feeding mechanism by means of a lever 35, fulcrumed to the bracket 36, projecting from the support 1 of the apparatus, which lever 35 is connected at its upper end to the slide 21 by means of a link 37, the lower end of the said lever carrying a roll 38, which works within an irregular shaped groove 39 formed in the cam 40, secured to the drive shaft 6.

Intermittent or stepped rotation is imparted to the rotatable turret 2 in order to bring the same to a state of rest at the various stations of the apparatus. It will be apparent from the foregoing that an enlarged flanged can end is first positioned in axial alignment with one of the apertures 8 of the rotatable table and that at a subsequent operation of the machine a previously cut gasket liner is placed in axial alignment with the flange of the positioned can end and that thereafter the gasket liner is assembled onto the flange of the can end. Inasmuch as the apertured table 2 is mounted for horizontal rotation and during its rotary movement the recessed apertures 8 thereof are brought successively beneath a stack of horizontally disposed cut gasket liners which normally rest on the upper surface of the rotatable turret, the lowermost liner of the stack of cut gasket liners will automatically seat itself into the upper enlarged recessed portion 9 of the aperture 8, so that as an apertured section of the table is carried from beneath the holder 25, or from within the sphere thereof, the seated lowermost gasket liner is automatically cut or separated from the remainder of the stack; no feed means being necessary or required to position the lowermost gasket liner of the stack within the enlarged seat 9, of the aperture 8. While the weight of the stack of cut ring liners contained within the holder 25 is sufficient to deposit the lowermost liner within the seat 9, so as to be supported by the shoulder $a$ of the apertures 8, nevertheless, it is obvious, if so desired, any suitable means may be employed for exerting a downward pressure onto the stack of ring liners to insure certainty as to the lowermost liner of the stack seating itself within the enlarged portion 9 of the apertures 8, and such means may be resorted to in case the weight of the stack of gasket liners is not sufficient for this purpose. In fact, all that is required to maintain a constant downward pressure on the stack of liners would be a weight fitted within the holder 25 to rest on the uppermost liner of the stack, said weight following the downward feed of the said stack. Such a form of weight is illustrated by Fig. 4 of the drawings, which weight 41 is provided with a series of vertical bores or openings 41$^a$ designed to fit over the vertical rods of the holder 25, so as to lower on the said rods with the diminishing head of the stack of ring liners contained within the holder.

The invention has been described and illustrated in its preferred embodiment, but it is obvious that various changes may be made in the construction and arrangement of the working parts thereof without deviating from the nature and scope of the invention, and such changes are contemplated, for instance, instead of a rotatable turret containing a series of apertures, each provided with a pair of enlarged seats for the reception of an unlined can end and a cut gasket liner and for retaining the same in axial alignment, any form of reciprocating structure provided with such a type of an aperture may be employed for moving beneath the stack of cut ring liners for removing the lowermost gasket liner of the stack, and I do not wish therefore to be understood as confining or limiting the invention to a rotatable turret, but wish to be understood as claiming the invention as broadly as the state of the art will permit.

While I have disclosed the horizontal movable carrier member as being presented first to the can end feed mechanism to receive an unlined flanged can end and at a subsequent movement brought beneath a stack of cut gasket liners to receive the lowermost liner of the stack and hold the same in spaced axial alignment with the unlined can end, it is obvious that the gasket liner may be first received and at a later movement of the carrier member there be received and held in spaced axial alignment with the positioned gasket liner an unlined flanged can end. This would only require that the holder for the cut gasket liner be positioned above the horizontally movable carrier member 2 at the station A and that the can end feed mechanism and the holder for the stack of unlined can ends be positioned at the station B of the apparatus.

By the expression carrier member as hereinafter employed is to be understood as meant an apertured rotatable turret or a horizontally reciprocating apertured slide, the recessed aperture of which is successively moved into position to receive an unlined can end and a cut gasket liner, or to receive the gasket liner and then the unlined flanged can end or otherwise place the same within the recessed aperture so that the gasket liner and the unlined can end will be supported in spaced axial alignment and so held by the carrier member advanced toward the assembling mechanism of the apparatus.

Having thus described the invention what is claimed as new and desired to be protected by Letters Patent is:

1. An apparatus for applying cut gasket liners to the flange of can ends, the same comprising a holder adapted to contain a stack of cut gasket liners, a recessed apertured horizontally movable carrier member associated with said holder for removing the lowermost liner of the stack and leaving the same seated within the uppermost recess of the aperture of said horizontally movable member, means for advancing an unlined flanged can end beneath the aperture of said carrier member for axial alignment with a cut gasket liner, and means for forcing the gasket liner through the aperture of the carrier member onto the flange of the positioned can end.

2. An apparatus for the described purpose, the same comprising a holder adapted to contain a stack of cut gasket liners, a recessed apertured carrier movable beneath said holder for removing the lowermost liner of the stack and leaving the same seated within the recessed aperture thereof, means for positioning an unlined flanged can end beneath the aperture of said carrier for axial alignment with a gasket liner, and mechanism for applying the gasket liner through the aperture of the carrier member onto the flange of the can end.

3. An apparatus for the described purpose, the same comprising a horizontally rotatable carrier provided with a series of circumferentially disposed spaced recessed apertures, mechanism for successively positioning unlined flanged can ends beneath said apertures, a holder adapted to contain a stack of cut gasket liners, the lowermost one of which is received into the recess of an aperture of the carrier member as moved beneath the holder and retained therein in axial alignment with a positioned can end, and means for forcing the gasket liner from its seat and through the aperture onto the flange of the said can end.

4. An apparatus for applying previously cut gasket liners to the peripheral flange of can covers for the production of interfolded hermetic seams with flanged can bodies, the same comprising, in combination, a horizontally movable carrier provided with recessed vertically disposed apertures, means including a ring liner stack holder which carries the lowermost gasket liner in contact with said carrier for positioning flanged can ends and previously cut gasket liners flatwise within the recessed portions of the apertures of said carrier for maintaining the same in spaced axial alignment, and mechanism for assembling the gasket liner onto the flange of the positioned can end by forcing the liner through the aperture of the said carrier.

5. The combination with a recessed vertically apertured carrier member, of means for positioning an unlined flange can end beneath said aperture and in axial alignment therewith, a holder adapted to contain a stack of cut gasket liners mounted above and in contact with said carrier, devices for imparting motion to the carrier member to place the recess aperture thereof beneath the holder to receive the lowermost liner of the stack and to move the recess aperture from beneath the holder to cut said liner from the stack of liners, and vertically movable means for assembling the gasket liners onto the flange of the can end by forcing the said liner through the aperture of the carrier member.

6. An apparatus for the described purpose, the same comprising a holder adapted to contain a stack of gasket liners, a horizontally movable carrier member provided with a recess aperture adapted to move beneath said holder and to receive in the recess thereof the lowermost liner of the stack, said aperture serving as a passageway for the gasket liner from one side to the other of said carrier, and means for assembling said liner relative to a positioned flanged can end by forcing the liner through the aperture of the carrier member.

7. An apparatus for the described purpose, the same comprising a holder adapted to contain a stack of gasket liners, a horizontally movable turret in contact with the bottom of said stack and provided with a series of circumferentially disposed recessed vertical apertures, mechanism for imparting movement to the turret for successively advancing its recessed apertures beneath the said holder to receive therein the lowermost liner of the stack of liners, devices for positioning flanged cans for axial alignment with the gasket liners, and vertically movable means for assembling the liner relative to the flange of the can ends by forcing the liners through the apertures of the turret.

8. In an apparatus for the described purpose, the combination with a holder adapted to contain a stack of previously cut gasket liners, and a recessed apertured member adapted for movement beneath said holder to receive within the recess of its aperture the lowermost liner of the stack contained within the holder, the apertures of said member serving as passageways for the gasket liners from one side to the other of said member.

9. An apparatus for the described purpose, the same comprising a holder adapted to contain a stack of cut gasket liners, a horizontally movable carrier member provided with a plurality of vertically disposed recessed apertures movable successively beneath said holder in contact with the bottom of said stack for receiving in the recess portion of the apertures the lowermost liner of the stack of liners and removing the same to an assembling station, means for positioning flanged can ends in the apertures of said carrier member for axial alignment with the liners, and mechanism for assembling the liners relative to the flange of the can ends by forcing the same through the apertures of the carrier member.

10. The combination of a rotary turret having shouldered apertures, the parts of said apertures above the shoulders being adapted to receive and fit around ring liners which are to be fed to can ends, a stack holder for ring liners arranged directly above the path followed by said apertures during the rotation of the turret so that said apertures receive the bottommost ring liners successively and carry them on said shoulders, means for feeding can ends successively in line below the successive ring liners in said apertures, and means for forcing the ring liners successively past said shoulders and into assembled relation with the can ends.

11. The combination of a rotary turret having shouldered apertures, the parts of said apertures above the shoulders being adapted to receive and fit around ring liners which are to be fed to can ends, a stack holder for ring liners arranged directly above the path followed by said apertures during the rotation of the turret so that said apertures receive the bottommost ring liners successively and carry them on said shoulders, means for feeding can ends successively into the lower parts of said apertures so as to be carried by said turret, and means for forcing the ring liners successively past said shoulders and into assembled relation with the can ends.

In testimony whereof I have signed my name to this specification in the presence of two subscribing witnesses.

IVAN D. THORNBURGH.

Witnesses:
 N. A. ACKER,
 D. B. RICHARDS.